(12) United States Patent
Lochkovic et al.

(10) Patent No.: US 6,434,305 B1
(45) Date of Patent: Aug. 13, 2002

(54) OPTICAL TRANSMISSION ELEMENT, PROCESS AS WELL AS DEVICE FOR ITS MANUFACTURE

(75) Inventors: Gregory A. Lochkovic, Hickory, NC (US); Siegfried Unterberger, Coburg; Frederic Zapf, Neustadt/Cbg, both of (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/511,559

(22) Filed: Feb. 23, 2000

(51) Int. Cl.$^7$ .................................................. G02B 6/44
(52) U.S. Cl. ....................................................... 385/114
(58) Field of Search ................................. 385/100–114

(56) References Cited

U.S. PATENT DOCUMENTS

| | | | | |
|---|---|---|---|---|
| 4,468,089 A | * | 8/1984 | Brorein | 385/114 |
| 5,524,164 A | * | 6/1996 | Hattori et al. | 385/114 |
| 5,905,835 A | * | 5/1999 | Bourghelle et al. | 385/114 |
| 5,908,873 A | * | 6/1999 | Shustack | 522/39 |
| 6,028,976 A | * | 2/2000 | Sato et al. | 385/114 |
| 6,197,422 B1 | * | 3/2001 | Murphy et al. | 428/378 |
| 6,253,013 B1 | * | 6/2001 | Lochkovic et al. | 385/114 |

FOREIGN PATENT DOCUMENTS

| | | | | |
|---|---|---|---|---|
| EP | 0495241 A2 | | 12/1991 | G02B/6/44 |
| GB | 2271859 A | | 4/1994 | G02B/6/44 |
| GB | 2 271 859 A | * | 4/1994 | |

OTHER PUBLICATIONS

IBM Technical Disclosure Bulletin, vol. 30 No. 01, Jan. 1996, pp. 321 and 322.

* cited by examiner

*Primary Examiner*—Akm E. Ullah
*Assistant Examiner*—Michelle R. Connelly-Cushwa

(57) ABSTRACT

An optical transmission element (BL1, BL2) shows at least two optical fiber sub-units (BL1, BL2) which are combined by means of a common plastic covering (BSA). To the plastic covering (BS1, BS2) of the respective optical fiber sub-unit (BL1, BL2) at least one binding agent (HM1, HM2) is applied which causes the adhesion of the plastic matrix of the common second covering (BSA) of the optical transmission element (BL12) to the respective plastic matrix of the coverings (BS1, BS2) of the at least two optical fiber sub-units (BL1, BL2).

21 Claims, 3 Drawing Sheets

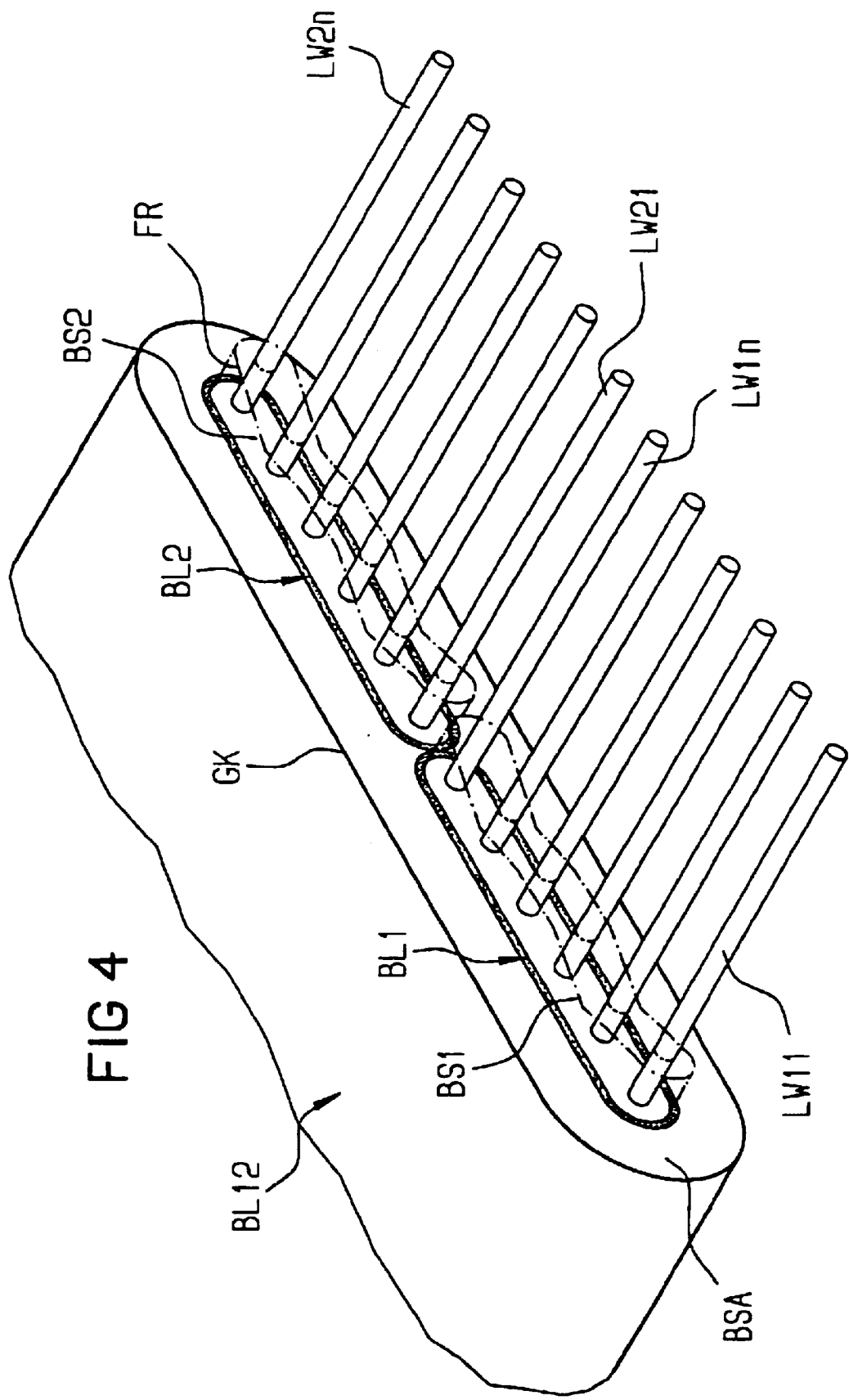

OPTICAL TRANSMISSION ELEMENT, PROCESS AS WELL AS DEVICE FOR ITS MANUFACTURE

The present invention relates to an optical transmission element and, more particularly, to an optical transmission element having controlled stiffness characteristics for controlled bending behavior.

In practical experience, the requirements for transmission capacities of communications cables are steadily increasing. In order to achieve this the density of optical fibers in the cable cross section is increased. Groups of optical fibers are combined into so called fiber ribbons as optical fiber transmission elements for better handling and mechanical protection. These fiber ribbons can then advantageously be combined into so called ribbon stacks, which makes a very high density per cable cross section possible. Presently optical fiber ribbons with, for example, up to 24 optical fibers arranged in a common layer essentially parallel beside each other and embedded into a common firm plastic layer, are used in optical communications cables.

During ribbon manufacture it is often difficult to cover multiple optical fibers such as, for example, 24 optical fibers with a common plastic coating due to processing and quality reasons. During ribbon manufacture, manufacturing tools, for example, can cause vibrations and different fiber tensions which can result in dislocation and asymmetrical orientation of the optical fibers in the finished ribbon. Therefore, frequently optical fiber ribbons with smaller fiber count such as 4, 8 or 12 are manufactured and then combined with a common plastic layer into a ribbon having a higher fiber count. For the second coating with a common plastic layer normally the same UV cured material is used as for the coating for the individual combined optical fiber ribbons. By combining of sub-units of optical fiber ribbons one 12-fiber ribbon can be manufactured from three 4-fiber ribbons and a 24-fiber ribbon can be manufactured from three 8-fiber or two 12-fiber ribbons.

In order to be able to splice the optical fiber ribbons of ribbon units manufactured by combining individual fiber ribbons to each other, their ribbon material is stripped, i.e., the common plastic coating of the common second layer around the ribbon sub-units as well as the plastic coating of the individual fiber ribbons is removed along a given length. In practice this results in the problem that during stripping of the ribbon material, projections or irregular edges occur which are called "wings." The apparent cause for this seems to be that the coating material for combining the individual ribbons does not combine sufficiently with the coating of the individual ribbons and, therefore, does not act like a singly manufactured plastic coating. This happens often in practice since commonly used ribbon materials often contain additives with separating compound characteristics so that there is no sufficiently stable bond between the coating material of the combination ribbon units and their own ribbon material. For stripping of the ribbon materials there are devices which simultaneously splice 8 or 12 fibers of the 8- or 12-fiber ribbon.

SUMMARY OF THE INVENTION

This invention is based on the objective of supplying an optical fiber transmission element whose common coating for combining the optical fiber sub-units combines trouble-free performance with the sub-units' plastic coatings. This goal is achieved by an optical fiber transmission element mentioned in the beginning where a binding agent is applied to the first coating around the respective sub-units which causes adhesion of the plastic matrix of the second common coating to the respective plastic matrix of the first coating of the two optical fiber sub-units.

The binding agent on the plastic coatings of the respective optical fiber sub-units achieves an improved bonding of their plastic materials to the plastic matrix of the common outer coating for combining the optical fiber sub-units so that these two coating layers essentially function as a unit, i.e., a single plastic coating around the optical fiber. In this way during stripping of the plastic coating, so called "wings", i.e., projections or irregular edges are avoided and precise sharp edges for the optical fiber sub-units are made possible.

The invention further concerns the process for manufacturing a fiber optic transmission element with at least a first and at least a second optical fiber sub-unit where multiple optical fibers are inserted into a first plastic coating for formation of the respective optical fiber sub-units and where these two optical fiber sub-units are combined by a common second coating which is characterized by the fact that at least one binding agent is applied to the plastic coating of the respective optical fiber sub-unit which causes the bonding of the plastic matrix of the common second coating to the respective plastic matrix of the first coating of the two optical fiber sub-units.

The invention also concerns a device for manufacturing an optical transmission element with at least a first and at least a second optical fiber sub-unit where one coating device respectively is provided which can insert multiple optical fibers into a first plastic coating and where a further coating device is provided which can combine the two optical fiber sub-units by a common second plastic coating, which is characterized by the fact that additional coating means are provided which can add at least one binding agent to the first plastic coating of the respective optical fiber sub-unit which effects a bonding of the plastic matrix of the common second coating to the respective plastic matrix of the first coating of the at least two optical fiber sub-units.

BRIEF DESCRIPTION OF THE FIGURES

FIG. 4 is a schematic presentation in perspective of the optical transmission element according to FIG. 1 after stripping out its optical fibers along a given length.

Elements with the same function and effect are given the same designations in FIGS. 1 to 4.

DETAILED DESCRIPTION OF THE INVENTION

Figure 1:
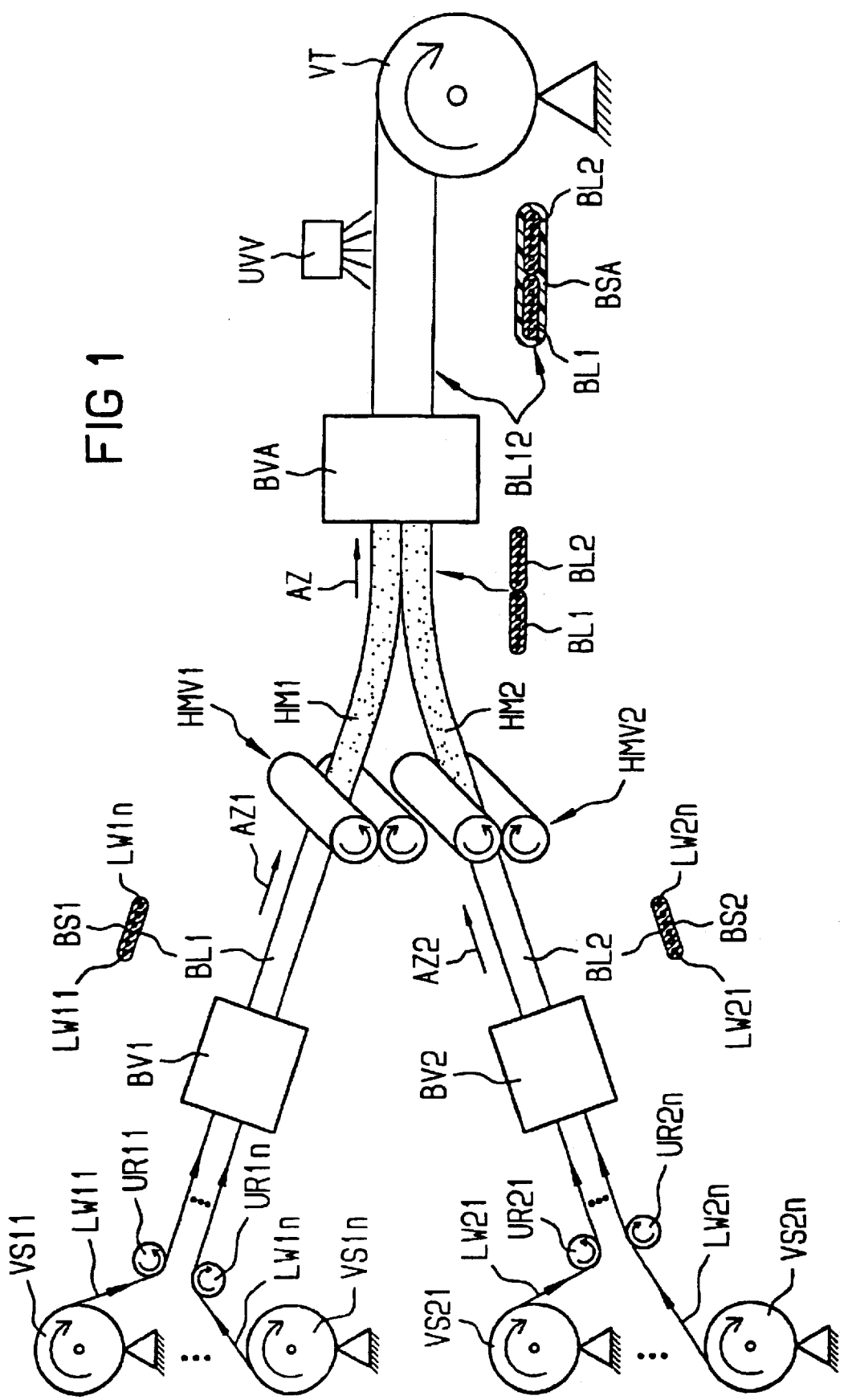
FIG. 1 is a schematic presentation of a device for manufacturing a first sample of the optical transmission element according to this invention.

FIG. 1 depicts a schematic representation of a manufacturing line for an optical transmission element BL12, A first group of optical fibers LW11 to LW1n is paid off their respective storage reels VS11 to VS1n and guided over guide rollers such as, for example, UR11 to UR1n together to a first coating device BV1. This means that at least one guide roller, for example, UR11 and at least one point of the travel path of the respective optical fiber serves to position this optical fiber into a given local position, i.e., to arrange the optical fibers LW11 to LW1n in a given spatial optical fiber structure relative to each other. In FIG. 1, the optical fibers LW11 to LW1n are positioned in a common position level as parallel as possible beside each other and on a straight line extension before insertion into the coating device BV1. In this configuration, or local structure, the optical fibers LW11 to LW1n are brought to the coating device BV1 together and are covered there all around with a common plastic coating BS1 in such a way that the cross section is an essentially flat rectangular optical fiber ribbon BL1. The cross section schematic of this ribbon is added in FIG. 1 after the coating device BV1. The optical fibers LW11 to LW1n are arranged in a common position level, essentially parallel beside each other, and are embedded in a common plastic coating BS1 which surrounds them as a common ribbon covering protecting them mechanically. For this ribbon covering BS1, preferably, a UV-cured material is being used. The optical fibers LW11 to LW1n are, therefore, mechanically fixed in their given position level by this ribbon coating BS1.

The finished optical fiber ribbon BL1 is guided from the first coating device BV1 in an essentially straight line AZ1 to a following additional coating device HMV1. This coating device HMV1 serves to add at least one binding agent HM1 as an additional coating to the outer surface of the optical fiber ribbon BL1. In FIG. 1, the coating device HMV1 is depicted as two rollers which are arranged transversely or laterally, respectively, especially vertical to the length extension of the ribbon BL1 running between them. The two rollers have a preferably soft surface, which is drenched in the binding agent. Felt rollers are especially advantageous as they wet the total width of the ribbon BL1 with the binding agent as it passes through them. In this way, the optical fiber ribbon BL1 running through the device continuously can be completely coated on the upper and lower side with the binding agent HM1.

It can, of course, also be useful to apply the binding agent HM1 to the outer surface of the common ribbon coating BS1 by spraying, damping, wiping or applying the binding agent in some other manner according to prevalent coating methods.

In the manufacturing line in FIG. 1, a second optical fiber ribbon BL2 is pre-manufactured at the same time as the first optical fiber ribbon BL1 in an analog way by means of the relevant manufacturing components. A second group of individual optical fibers LW21 to LW2n is paid off their respective storage reels VS21 to VS2n. By means of at least one guide roller as, for example, UR21 to UR2n in their path the optical fibers LW21 to LW21 are brought into their desired configuration, i.e., in a local position relative to each other, before they are inserted in the following coating device BV2 for a common coating of a plastic layer or coating BS2. The optical fibers LW21 to LW2n again are arranged—as in ribbon BL1—before insertion into the coating device BV2 in a common position level as parallel as possible beside each other. The optical fibers LW21 to LW2n extend in this common position level essentially in a straight line. The ribbon formation of the finished second optical fiber ribbon manufactured by means of coating device BV2 is shown in cross section after the schematic of the coating device BV2. The second optical fiber ribbon depicts a cross section of a flat rectangular geometric form. The optical fibers LW21 to LW2n are arranged in the finished ribbon BS2 in a common position level essentially parallel beside each other and embedded in common plastic coating or plastic layer BS2 respectively. This plastic coating adheres all around the group of optical fibers LW21 to LW2n in a firm way. In this way, the optical fibers LW21 to LW2n are fixed mechanically with a given spatial structure within the plastic material of the common ribbon coating BS2. The second finished ribbon BL2 travels after leaving the coating device BV2 in essentially a straight line in the payoff direction AZ2.

The two ribbons BL1, BL2 are preferably constructed identically, i.e., they preferably show the same number of optical fibers and the same cross section formation.

The second ribbon BL2 is also guided to a following second coating device HMV2 which is constructed like coating device HMV1 for the first ribbon. This second coating device HMV2 serves to coat the plastic covering BS2 of second ribbon BL2 with an additional binding agent HM2 over the total width on the upper and lower surface during the continuous pass through. In FIG. 1, the additional coating device HMV2 is constructed of two rollers; the second ribbon BL2 passes through the rollers. The two rollers are transverse, especially vertical to the length extension of the continuously running ribbon BL2. The two rollers of the additional coating device HMV2 lie against the upper and lower surface of the plastic coating BS2 of the ribbon BL2. They preferably have an absorbent soft outer surface which is drenched with the binding agent HM2. In this way both the upper and lower surfaces of ribbon BL2 can be wetted by the binding agent HM2. It is, of course, possible to apply the binding agent HM2 to the outer surface of the plastic coating BS2 of the ribbon BL2 by means of other prevalent methods.

After passing through the additional coating devices HMV1, HMV2 the first and second ribbons BL1, BL2 are brought together in such a way that their length edges which face each other are in contact and are arranged in a common position level essentially parallel beside each other. This configuration of the two ribbons BL1, BL2 is shown in FIG. 1, in cross section, to depict their local relative position with each other.

These two optical fiber ribbons BL1, BL2, arranged in a common position level are guided in an essentially straight line path AZ to a further common coating device BVA. The coating device BVA serves to embed the two ribbons BL1, BL2 into a common plastic covering. By means of the coating device BVA, the two optical fiber ribbons BL1 BL2 are surrounded by a common plastic jacketing BSA, which adheres all around in a firm manner to the ribbon coatings BS1, BS2. In this way, the two individual ribbons BL1, BL2 are combined into a larger optical fiber unit, i.e., an optical fiber ribbon with a larger fiber count than either optical fiber sub-unit BL1 or BL2. By way of illustration, this new optical fiber ribbon BSA manufactured from two individual optical fiber ribbons is shown in FIG. 1 in cross section. The common outer covering BSA which surrounds the two individual ribbons BL1, BL2 and which adheres in a firm way to their ribbon coatings BS1, BS2 generally has a rectangular outer contour. The result is an optical fiber ribbon BL12 with an essentially flat rectangular cross section, which shows two individual fiber ribbons BL1, BL2 as optical fiber sub-units in a common position level and essentially located parallel beside each other.

Before the common jacketing of the two individual optical fiber ribbons BL1, BL2 with the common plastic covering BSA, a binding agent HM1, HM2 is applied to the outer surfaces of the plastic coverings BS1, BS2 of the individual ribbons BL1, BL2 as completely as possible. This effects a better adherence of the plastic matrix of the common jacketing layer BSA to the respective plastic matrix of the ribbon coatings BS1, BS2. This chemical coupling between the plastic matrix of the following common second covering BSA for combining the two individual ribbons BL1, BL2 and the plastic matrix of the individual ribbon coatings BS1, BS2 is achieved by the fact that the respective binding agent HM1, HM2 contains at least one substance from the group photo initiators. Photo initiators with an energy absorption in the area of wavelengths between 250 and 400 µm are preferred. Typical representatives are especially the following photo initiators:

Lucirin 8728 (trade name)
Irgacure 184, 500, 651, 907 (trade name of Ciba company)
Darocure 1173, 1116 (trade name of Merck company)
Quantacure BELA, BMS, BTC, DMB, EOD, QTX, ITX (trade name of Ward Blankinsorb company)
Diethoxyacetophenon
Benzoinisopropylether It is especially advantageous if the binding agent contains at least one substance from the group of reactive monomers. Reactive monomers are preferably Mono-, Di-, Tri- and/or Tetra-acrylate or methacrylate respectively. Typical representatives of these reactive monomers are especially:

Diethylenglycoldi (meth)acrylate
Dietpropylenglycoldi (meth)acrylate
Triethylenglycoldi (meth)acrylate
Tetraethylenglycoldi (meth)acrylate
1,6-Hexandioldi (meth)acrylate
Neopenthylglycoldi (meth)acrylate
Tetradecan-/Pentadecan-diol-di (meth)acrylate
Ethoxylated Bisphenol-A-di (meth)acrylate
Pentaerythritoltetra (meth)acrylate
Dipentaerythritolhexa (meth)acrylate
Pentaerythritoltri (meth)acrylate
Propoxylated Pentaerythritoltri (meth)acrylate
ethoxylated, propoxylated Neopentylglycoldi (meth)acrylate
Trimethylolpropantri (meth)acrylate
propoxylated Trimethylolpropantri (meth)acrylate
Glycerine-di and tri-(meth)acrylate
Propoxilated Glycerintri (meth)acrylate
Tris (2-hydroxyethyl)isocyanurattriacrylate
Propylenglycoldi (meth)acrylate
Isobornyl (meth)acrylate
Phenoxyethyl (meth)acrylate
Isodecyl (meth)acrylate
N-Vinylpyrrolidon
Ethoxylated Monoacrylate In order to enable as thin as possible application of the binding agent to the outer surface of the respective ribbon coating BS1, BS2, it is expedient to add at least one thinning and/or swelling material to the respective binding agent. Preferably organic solvents are selected as thinner and swelling material. Those organic solvents with a higher flash point are preferred. The following are suitable:

Ketones: acetone, Propanone, Butanone, Hexanone
Carbolic acid ester, cold cleaners
higher chain, cyclical hydrocarbons, Dekalin
alcohols
aromatic hydrocarbons, Xylol
Chloparaffins
Terpene hydrocarbons
low chain polyether In order to achieve high adhesion of the two plastic layers it is expedient to apply the binding agent HM1, HM2 respectively in a minimal layer thickness onto the plastic coatings BS1, BS2 of the two optical fiber ribbons BL1, BL2. This is made possible through the addition of a thinning agent.

Viewed together, the plastic coatings of the individual optical fiber ribbons as sub-units, for example, consisting of 4-, 8-, 12-fiber ribbons are wetted with binding agents before application of common jacketing that forms a second ribbon covering layer. These binding agents are chemically in the group of photo initiators, reactive monomer acrylates, methacrylates and/or organic solvents. Usage in the framework of the invention can be individual or in various combinations. A thinning of the binding agent is especially expedient to avoid a strong thickening of the respective first ribbon layer.

With an original ribbon thickness of, for example, approximately 290 µm where the respective fiber diameter is, for example, approximately 250 µm the layer thickness of the common jacketing layer BSA is chosen in the area of, for example, approximately 10 µm. In this way, with these dimensions the finished ribbon structure, which is a combination of several layers, has a total maximum thickness, for example, of approximately 310 µm.

By means of the binding agent between the two plastic layers clean sharp edges can be achieved during separation into sub-units which is essential for splicing processes. Fraying or displacement of edges of the multi-layer ribbon covering are therefore avoided. The dual layer plastic covering around the optical fibers acts like a single-layer of common construction, i.e., a homogeneous plastic jacketing. The plastic layers of the individual ribbons BL1, BL2 and their common jacketing layer BSA are chemically fixed or coupled in such a way that a firm bonding is achieved. A separate loosening of the individual plastic layers from each other, especially during freeing of the individual optical fibers for splicing is, therefore, mainly avoided.

In the manufacturing line in FIG. 1, the finished ribbon combination BL12 coming from the coating device BVA is finally dried and cured by means of a curing device UVV. Following this, it travels onto a storage reel VT.

If UV (ultraviolet rays) curable plastics, especially resins are used for the plastic coatings of the individual ribbons and/or the common covering, a UV light source is used for the respective curing device which irradiates the individual ribbon coatings and/or the finished ribbon combination BVA immediately after the respective coating device BV1, BV2, BVA. This achieves an especially effective cross linking of the plastic materials of the common covering.

The following sample was tested with special success:

One twelve-fiber ribbon with a ribbon thickness of, for example, approximately 290 µm is manufactured using a commercial urethane acrylate and a high efficiency UV lamp in a cuvette system of known construction at approximately 300 m/min. Two of the ribbons are coated in-line, i.e., during the same production process, with the following binding agent mixtures and solvents, brought together in a tool and combined into a 24-fiber ribbon by covering it with the urethane acrylate of the first plastic coating. Curing is done by the same UV lamp with, for example, a 300 m/min speed. The thickness of the finished ribbon is approximately 310 µm. For binding agents, the following pure materials or mixtures were used:

| Solvent 1: | Acetone, pure |
|---|---|
| Solvent 2: | Darocur 1173, pure |
| Solvent 3: | Benzophenone/Irgacure 500 1:1 as a 10% solution terpene |
| Solvent 4: | Mixture of Dekalin/Xylor 1:1 |
| Solvent 5: | Isobornylacrylate, pure |
| Solvent 6: | Darocure |

|  | -continued |
|---|---|
|  | 1173/Tripropyleneglycoldiacrylate 1:2 as a 20% solution in isopropanol |
| Solvent 7: | longer chain carbolicxy acid methyl ester, pure |
| Solvent 8: | Phenoxyethylacrylate/Dekalin 1:9 |
| Solvent 9: | Trimethylolpropantrimethacrylate, 20% in Butanone |
| Solvent 10: | Octadecylacrylate, pure |
| Solvent 11: | short chain Propylenegycol with 30% propoxylated Dimethacrylate |

Figure 2:
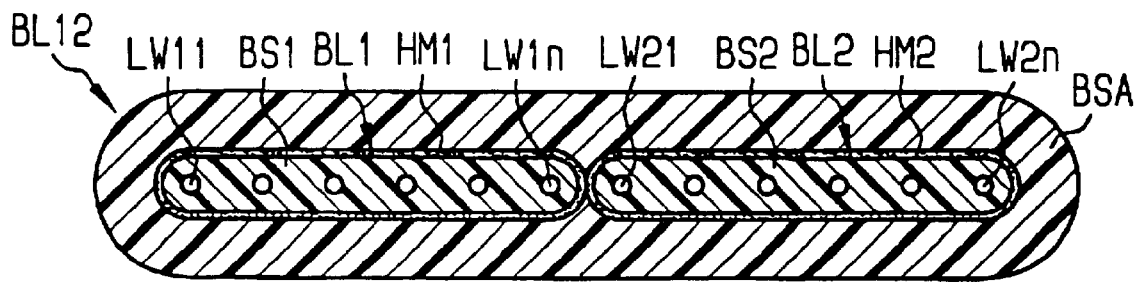
FIG. 2 is a schematic cross section presentation of an optical transmission element manufactured with the device of FIG. 1.

FIG. 2 shows in schematic and enlarged cross section representation the finished optical fiber ribbon BL12 in FIG. 1. The two individual ribbons BL1, BL2 are in a common position level essentially parallel beside each other. Their length edges facing each other are in contact. On their outer surface a binding agent HM1 and HM2, respectively, has been applied all around. This effects a chemical docking or bonding of the respective ribbon coatings BS1, BS2 with the plastic matrix of the common jacketing BSA. This common plastic covering BSA surrounds the two individual ribbons as a common covering, i.e., the two individual ribbons BL1, BL2 are embedded in the plastic material of the common jacketing BSA and, therefore, combined into a total unit. By using the binding agents HM1 and HM2, respectively, a total bond between the plastic coatings of the individual ribbons BL1, BL2 and the common coating layer BSA is created so that this two layer plastic jacketing functions like a single homogeneous plastic covering.

Figure 3:
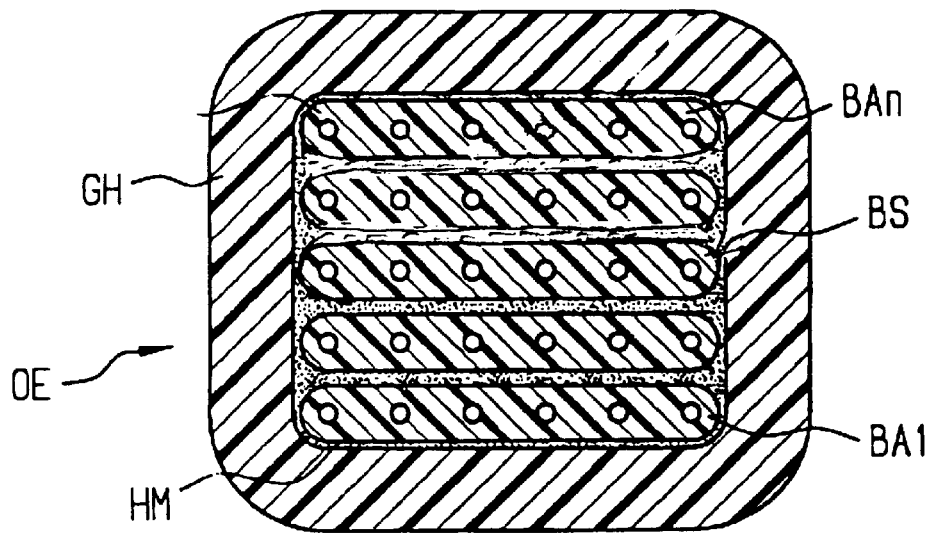
FIG. 3 is a schematic cross section presentation of a further version of an optical transmission element according to this invention.

FIG. 3 is a schematic cross section representation depicting a further optical transmission element OE, which is modified versus the optical transmission element BL12 in FIG. 2. The optical transmission element OE in FIG. 3 depicts an optical fiber stack BS which consists of multiple optical fiber ribbons BA1 to BAn. Each individual optical fiber ribbon BA1 to BAn is essentially constructed according to one of the ribbons BL1, BL2 in FIG. 1. Consequently, an essentially rectangular ribbon stack BS is formed. All around the outer surface of the ribbon stack a binding agent HM is applied in order to again achieve a firm coupling or adhesion of the plastic matrix of the individual ribbon coatings to a common second outer plastic jacketing GH which firmly surrounds the ribbon stack BS. The outer contour of this common jacketing is essentially rectangular in the cross section representation in FIG. 3. In this way, an optical transmission element OE results with an essentially rectangular cross section. For binding agents the same substances are useful which were given for the optical transmission elements BL12 in FIGS. 1 and 2.

By applying a binding agent EM to the outer surface of the ribbon stack BS the common second jacketing GH adheres firmly to the plastic material of the single ribbons BA1 to BAn of the ribbon stack BS. If tensile forces act in the longitudinal direction of the optical transmission element OE, shearing movements between the outer common second jacketing GH and the respective individual ribbon coating are largely avoided. If tensile forces occur in the optical transmission element OE along its length extension, relative movements between the plastic jacketing for combining optical fiber sub-units and their individual plastic coverings are largely avoided.

For applying the binding agent HM1 or HM2, respectively, onto the two ribbons BL1, BL2 in FIG. 1 it can be expedient to provide a common coating device after bringing together the two ribbons BL1, BL2 immediately before entrance into the common coating device BVA provided for combining the individual ribbons. Separate coating devices HMV1, HMV2 for separate application of binding agents HM1, HM2 onto the two ribbons BL1, BL2 can also be replaced by a common coating device for common application of the binding agent.

It can also be expedient to apply a binding agent to is already manufactured ribbons or other transmission elements, i.e., ribbons manufactured in a separate production process and stored, in order to combine them by jacketing with a common plastic covering into a larger optical fiber sub-unit. In this case, the binding agent works in the same way between the plastic coatings of the optical fiber sub-units and the common jacketing for combining these sub-units.

For curing of the respective ribbon coatings such as, for example, BS1, BS2 in FIG. 1 it can be expedient to follow the respective coatings device such as, for example, BV1 or BV2 by a separate curing device. These were eliminated in FIG. 1 for clarity.

Viewed comprehensively, the binding agent causes a sort of cross linking between the plastic matrices of the plastic coatings of the individual optical fiber sub-units and the plastic jacketing of the combination of these optical fiber sub-units, whereby the two layers embedding the optical fibers within a given spatial structure acts essentially like a common single plastic jacketing. If there are tensile forces along the length extension of the optical transmission element, shear movements between the outer common second jacketing and the individual ribbon coverings are largely avoided. In case of tensile forces along the length extension of the optical transmission element, relative movements between the plastic jacketing for combining optical fiber sub-units and their individual plastic coverings are largely avoided. At removal, i.e., decoating of the optical fibers of the plastic material of the common jacketing as well as the adhering individual coverings of the optical fiber sub-units, there is no "fraying" at the removal edge of the plastic material. The two plastic material layers can be removed together as a single layer because they adhere together due to the binding agent.

FIG. 4 depicts the optical fiber ribbon BL12 from FIGS. 1 and 2, respectively, after the optical fibers LW11 to LW1n as well as LW21 to LW2n have been freed from the dual layer plastic jacketing BS1+BSA, BS2+BSA along a given end length by means of known, for example, mechanical separating and/or stripping methods. The bond of the respective ribbon coating BS1 and BS2 and the common jacketing BSA is therefore so strong due to the use of binding agents HM1 and HM2, respectively, that relative movements between their two layers BS1 and BS2, respectively, and BSA are avoided during stripping. This results in a largely smooth precise sharp edge GK of the plastic jacketing. The optical fibers can therefore be freed individually in a clean and blank manner. Residue of plastic material that would remain on the optical fibers is largely avoided. Without the additional binding agent layer between the respective ribbon coating BS1 and BS2, respectively, and the common jacketing BSA a fraying of the edges of the plastic jacketing due to shearing movements would result. Such an undefined edge is shown by a dashed line in the drawing and designated as FR.

Accordingly, what is claimed is:

1. An optical transmission element having at least first and second optical fiber sub-units, the respective optical fiber sub-units comprising at least one optical fiber in a respective first plastic covering, the optical fiber sub-units being surrounded by a common second covering thereby forming a unit, the common second covering being the same plastic material as the respective first plastic coverings of the optical fiber sub-units, and at least one binding agent generally covering the optical fiber sub-units, whereby the at least one binding agent causes adhesion of the common second covering to respective portions of the sub-units.

2. The optical transmission element according to claim 1, the at least one binding agent comprising at least one substance from the group of photo initiators.

3. The optical transmission element according to claim 1, the at least one binding agent comprising at least one substance from the group of reactive monomers.

4. The optical transmission element according to claim 3, at least one reactive monomer being selected from the group consisting of pentaerythritoltetra acrylate, pentaerythritoltetra methacrylate, isobornyl acrylate, isobornyl methacrylate, isodecyl acrylate, and isodecyl methacrylate.

5. The optical transmission element according to claim 1, the at least one binding agent comprising at least one organic solvent.

6. The optical transmission element according to claim 1, the at least one binding agent comprising at least one thinning and/or swelling material.

7. The optical transmission element according to claim 1, the at least one binding agent being selected from a group of materials containing benzophenone, isobornylacrylate, and trimemethylolpropantrimethacrylate.

8. The optical transmission element according to claim 1, the optical fiber sub-units being an optical fiber ribbon.

9. The optical transmission element according to claim 1, the optical fiber sub-units being arranged essentially parallel beside each other.

10. The optical transmission element according to claim 1, the optical fiber sub-units comprising optical fiber ribbons arranged into a ribbon stack.

11. The optical transmission element according to claim 1, the first plastic covering of the optical fiber sub-units being a UV-curable plastic.

12. The optical transmission element according to claim 1, the at least one binding agent covering as completely as possible the outer surface of the first plastic covering of the respective optical fiber sub-units.

13. A method for manufacturing an optical transmission element having at least first and second optical fiber sub-units comprising:

forming a first optical fiber subunit by generally surrounding at least one optical fiber with a first plastic covering;

forming a second optical fiber sub-unit by generally surrounding at least one optical fiber with a first plastic covering;

applying at least one binding agent onto said first plastic coverings; and forming a common second covering generally around the optical fiber sub-units, the common second covering being the same material as the first plastic coverings of the optical fiber sub-units, said at least one binding agent causing adhesion of the common second covering to respective portions of the optical fiber sub-units.

14. The method of claim 13, the step of applying at least one binding agent being selected from one of the group consisting of spraying, damping, and wiping.

15. The method of claim 13, further comprising curing one of the coverings with UV radiation.

16. The method of claim 13, the step of applying at least one binding agent further comprising at least one substance from the group of photo initiators.

17. The method of claim 13, the step of applying at least one binding agent further comprising at least one substance from the group of reactive monomers.

18. The method of claim 17, the step of applying at least one reactive monomer further being selected from the group consisting of pentaerythritoltetra acrylate, pentaerythritoltetra methacrylate, isobornyl acrylate, isobornyl methacrylate, isodecyl acrylate, and isodecyl methacrylate.

19. The method of claim 13, the step of applying at least one binding agent further comprising at least one organic solvent.

20. The method of claim 13, the step of applying at least one binding agent further comprising at least one thinning and/or swelling material.

21. The method of claim 13, the at least one binding agent being selected from a group of materials containing benzophenone, isobornylacrylate, and trimemethylolpropantrimethacrylate.

* * * * *